United States Patent [19]
Jean et al.

[11] Patent Number: 5,586,513
[45] Date of Patent: Dec. 24, 1996

[54] WATERTIGHT AND THERMALLY INSULATING TANK BUILT INTO A BEARING STRUCTURE

[75] Inventors: Pierre Jean, Dampierre; Jean-Michel Chauvin, Plaisir, both of France

[73] Assignee: Gaztransport & Technigaz, Trappes, France

[21] Appl. No.: 529,401

[22] Filed: Sep. 18, 1995

[30] Foreign Application Priority Data

Sep. 20, 1994 [FR] France .................................. 94 11165

[51] Int. Cl.$^6$ ...................................................... B63B 25/16
[52] U.S. Cl. ........................ 114/74 A; 220/415; 220/450; 220/901
[58] Field of Search ........................ 114/74 A; 220/901, 220/902, 415, 450

[56] References Cited

U.S. PATENT DOCUMENTS

| | | | |
|---|---|---|---|
| 3,399,800 | 9/1968 | Gilles | 220/901 |
| 3,785,320 | 1/1974 | Bourgeois et al. | 114/74 A |
| 4,065,019 | 12/1977 | Letourneur | 114/74 A |
| 4,747,513 | 5/1988 | Betille et al. | 220/452 |
| 5,269,247 | 12/1993 | Jean | 114/74 A |
| 5,447,112 | 9/1995 | Jean | 114/74 A |

FOREIGN PATENT DOCUMENTS

| | | |
|---|---|---|
| 0248721A1 | 12/1987 | European Pat. Off. . |
| 0543686A1 | 5/1993 | European Pat. Off. . |
| 0573327A1 | 12/1993 | European Pat. Off. . |
| 1438330 | 4/1966 | France . |
| 2105710 | 4/1972 | France . |
| 2146612 | 2/1973 | France . |
| 2302982 | 10/1976 | France . |
| 2462336 | 7/1979 | France . |
| 2504882 | 4/1981 | France . |
| 2683786 | 11/1991 | France . |
| 2709726 | 9/1993 | France . |
| 1400638 | 7/1975 | United Kingdom . |

*Primary Examiner*—Sherman Basinger
*Attorney, Agent, or Firm*—Pollock, Vande Sande & Priddy

[57] ABSTRACT

A watertight, thermally insulating tank built into a bearing structure and including a primary watertight barrier contacting material within the tank and including strakes having edges turned upwardly towards an interior of the tank. A secondary watertight barrier is positioned between the primary watertight barrier and the bearing structure. The tank includes primary and secondary insulating barriers. The insulating barriers are alternately arranged with the watertight barriers. A weld support is mechanically held on the primary insulating barrier and forms an expansion joint. The strakes are butt-welded to two faces of the weld support. The secondary watertight barrier and the insulating barriers each include prefabricated panels fixed to the bearing structure. A zone at a junction between two adjacent panels is filled in at least to ensure continuity of the secondary watertight barrier. Each prefabricated panel is formed of a first rigid plate including a layer of thermal insulant. The panels and the thermal insulant together form the secondary insulating barrier. A flexible sheet is bonded substantially to the entire surface of the thermal insulant. The flexible sheet includes at least one continuous fine metal foil forming the secondary watertight barrier. A second layer of thermal insulant at least partially covers the flexible sheet and is bonded thereto. A second rigid plate covers the second thermal insulant layer and together they form the primary insulation barrier.

22 Claims, 4 Drawing Sheets

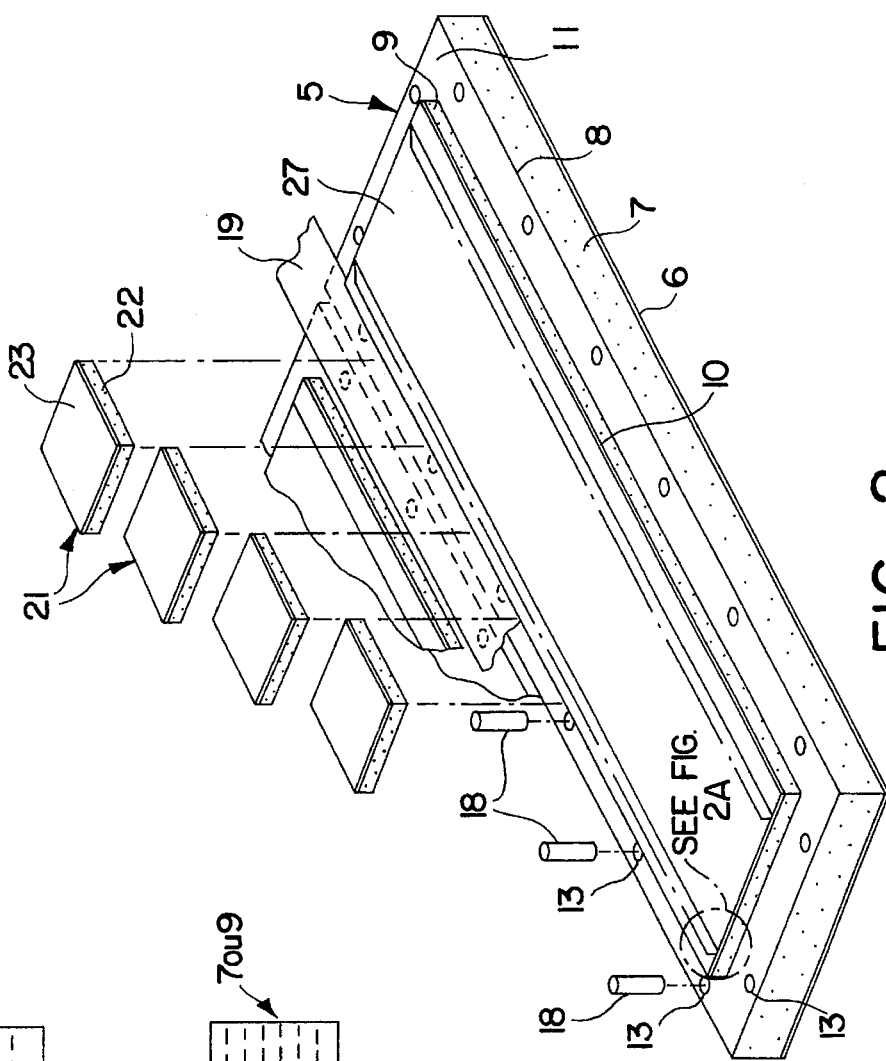
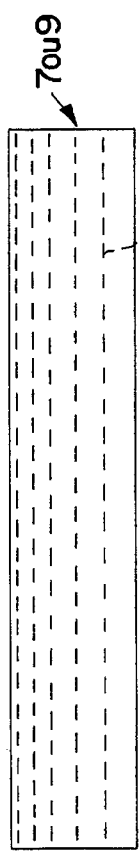
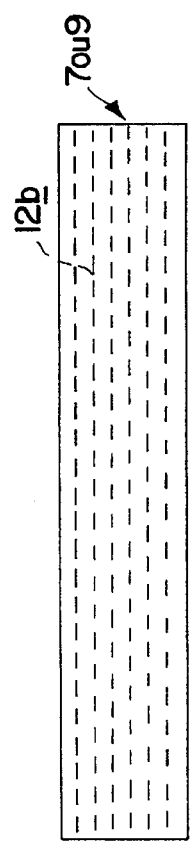
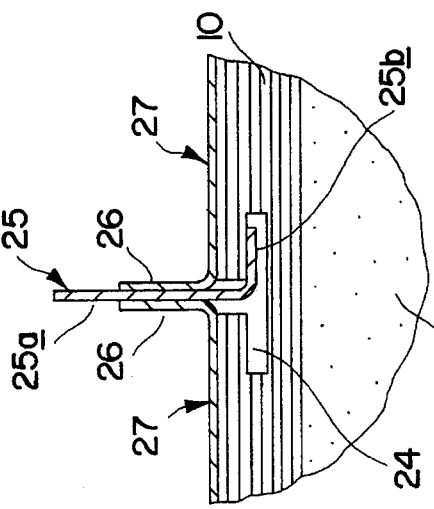
FIG. 2
FIG. 5
FIG. 6
FIG. 2A

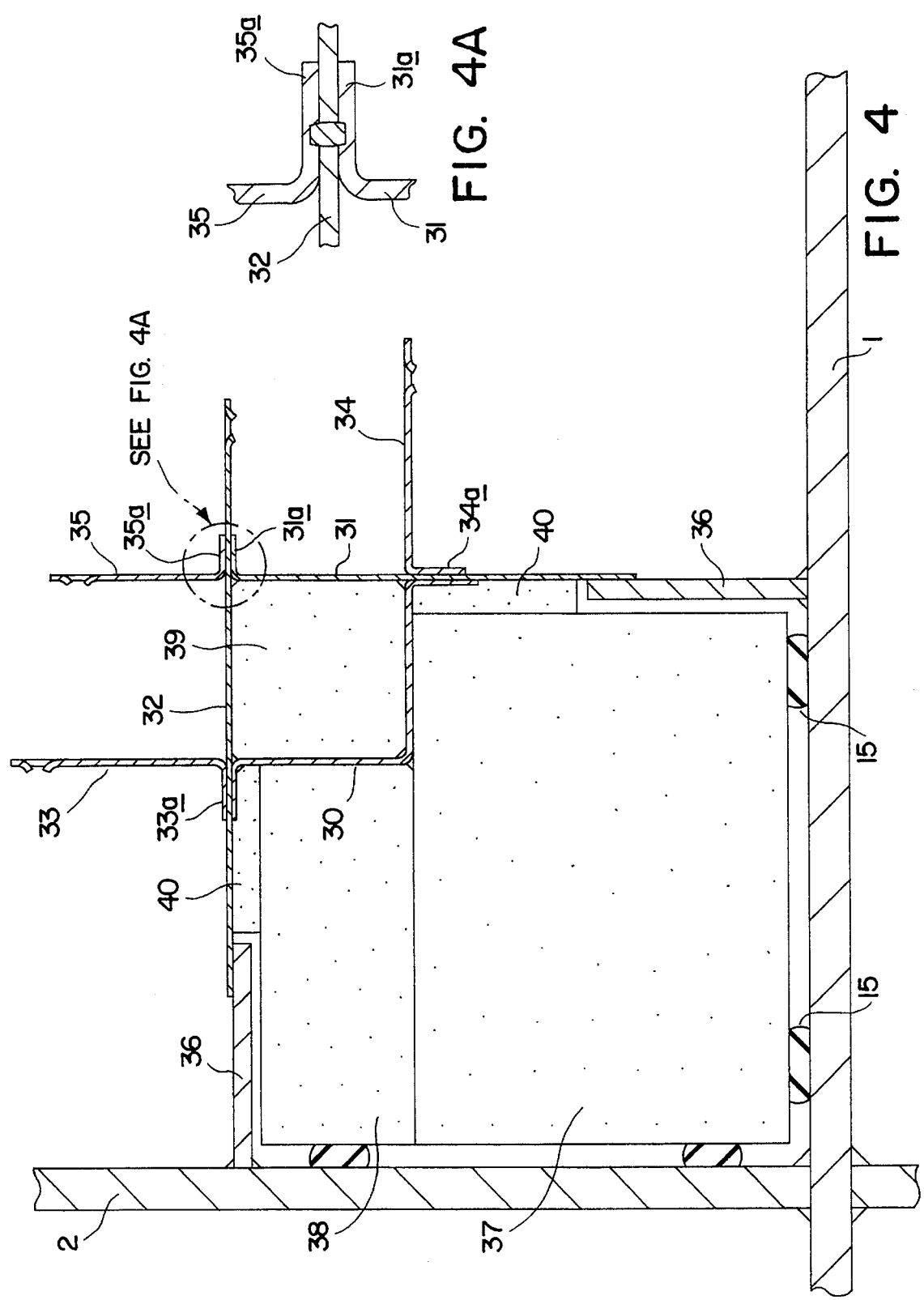

WATERTIGHT AND THERMALLY INSULATING TANK BUILT INTO A BEARING STRUCTURE

BACKGROUND OF THE INVENTION

The present invention relates to the production of watertight and thermally insulating tanks built into a bearing structure, especially the hull of a ship, intended for the transportation by sea of liquefied gases and, in particular, the transportation of liquefied natural, gases with a high methane content.

In French Patents 1,438,330, 2,105,710, 2,146,612 and 2,683,786, there has already been described the production of a watertight and thermally insulating tank of this type, the said tank consisting of two watertightness barriers in succession, a primary one in contact with the liquefied gas transported and a secondary one located between the primary barrier and the bearing structure, these two watertightness barriers being alternated with two layers of thermal insulation termed "insulating barriers". In these embodiments, the primary and secondary insulating barriers are made up of parallelepipedal compartments filled with lagging and the primary and secondary watertightness barriers are formed of metal strakes, for example made of invar, with turned-up edges and welded on either side of a weld flange.

It has also been proposed, for example in French Patent 2,462,336 and 2,504,882, to produce at least one of the insulating barriers by means of a layer of cellular material. However, it has been observed that it was desirable for the primary insulating barrier to include, towards the inside of the tank, a rigid plate giving better resistance with regard to the impacts which arise on the walls of the tank through the movements of the liquid during transport, which movements are due to the rolling and pitching of the ship, and this technique was adopted, especially, in French Patent 2,504,882.

However, in all cases, there was a problem relating to the fastening of the primary barriers which have to be held elastically bearing against secondary barriers. In French Patent 2,462,336, the primary barrier was fastened to the secondary barrier without any joining to the bearing structure of the ship, and this was highly advantageous as regards the insulation characteristics, but exhibited drawbacks as regards the cost price and the ability to purge the primary insulating barrier. French Patent 2,504,882 proposed to fasten the primary insulating barrier directly to the bearing structure of the ship using anchoring members which passed through the secondary watertightness barrier however, this technique generated stress concentration zones in the secondary watertightness barrier and set up a direct thermal bridge between the primary barrier and the bearing structure, which was unfavourable from the insulation performance point of view.

Furthermore, it is known that, for a constant tank thickness, it is beneficial to increase the thickness of the secondary insulating barrier to the detriment of the primary insulating barrier because, should there be a leak at the primary watertightness barrier, the accidental cold zone is all the further away from the double hull as the secondary insulating barrier becomes thicker. Unfortunately, the reduction in thickness of the primary insulating barrier runs into a difficulty which is due to the structure of the angles for connecting the walls of the tank together in the zones where the transverse bulkheads of the ship meet the double hull; in actual fact, according to the techniques described, the connecting corner was produced in the form of a ring, the structure of which remains constant right along the solid angle of intersection of the said transverse bulkhead with the double hull of the ship as described, for example, in French Patent 2,683,786. It is known that when the ship is moving in heavy seas, the deformation of the girder which forms it generates very significant tensile stresses at the primary and secondary watertightness barriers, which stresses, in fact, add to the tensile stresses generated in these watertightness barriers when the tank is subjected to cold. The connecting ring must of course allow these forces to be taken up by the bearing structure and, in French Patent Application 93-10720, a structure has been proposed which allows these forces to be taken up while adopting a thin primary insulating barrier.

In the state of the art which has just been described, it is observed that the various problems mentioned hereinabove have still been solved one by one by describing structures in which the primary and secondary watertightness barriers each consist of an assembly of metal strakes made of invar welded to one another with turned-up edges. Each of these two watertightness barriers has to be held bearing elastically on its associated insulating barrier on the one hand, avoiding thermal bridges to the bearing structure and, on the other hand, without giving rise to prohibitive production costs. In all the embodiments described in the state of the art for these tanks with a double watertightness barrier, the primary and secondary insulating barriers are independent and fitted separately.

SUMMARY OF THE INVENTION

The Applicant Company proposes, according to the present invention, a tank structure including two watertightness barriers in succession and making it possible:

on the one hand, to use a thin primary insulating barrier including a rigid plate giving good resistance with regard to the impacts produced on the walls of the tank by the movements of the liquid during transport, the small thickness of this insulating barrier having the aforementioned advantage in the event of leakage at the primary watertightness barrier;

and, on the other hand, to reduce considerably the cost price of such a tank by using prefabricated panels which, in a single operation, allow the two secondary barriers and the primary insulating barrier of the tank to be fitted in a single operation: by adopting the structure according to the invention, it is possible to reduce the cost price by approximately 25%. The invention therefore consists in having overcome the prejudice which, for tanks with a double watertightness barrier, required independent secondary and primary insulating barriers to be formed and fitted respectively before and after the secondary watertightness barrier, which was itself independent.

According to the invention, the aforementioned prefabricated panels include two layers of thermal insulant between which a flexible layer constituting the secondary watertightness barrier is inserted, the assembly forming a sandwich whose cohesion is maintained by any appropriate means, for example by adhesive bonding; as will be explained hereafter, this sandwich includes, on its two outer faces, rigid plates, one of which makes it possible to hold it against the bearing structure and the other of which makes it possible to hold the primary watertightness barrier. Moreover, with the structure according to the invention, the secondary watertightness barrier transmits only a small loading to the connecting ring, which is located in the corner of the walls of the tank, so that the structure of this ring may be simplified.

As a consequence, the subject of the present invention is a watertight and insulating tank built into a bearing structure, especially of a ship, the said tank including two watertightness barriers in succession, one, a primary one, in contact with the product contained in the tank and the other, a secondary one, located between the primary barrier and the bearing structure, these two watertightness barriers being alternated with two thermally insulating barriers, the primary watertightness barrier consisting of metal strakes with edges turned up towards the inside of the tank, the said strakes being made of thin sheet metal with a low coefficient of expansion and being butt-welded via their turned-up edges to the two faces of a weld support which is held mechanically on the primary insulating barrier and constitutes an expansion joint, characterized in that the secondary barriers and the primary insulating barrier essentially consist of a set of prefabricated panels fixed to the bearing structure, each panel being formed, firstly, of a first rigid plate bearing a layer of thermal insulant and together with it constituting a secondary insulating barrier element, secondly, of a flexible sheet bonded substantially to the entire surface of the layer of thermal insulant of the aforementioned secondary insulating barrier element, the said sheet including at least one continuous fine metal foil forming a secondary watertightness barrier element, thirdly, of a second layer of thermal insulant, which at least partially covers the aforementioned sheet and which is bonded thereto and, fourthly, of a second rigid plate covering the second layer of thermal insulant and with it constituting the primary insulation barrier, the zones at the junction between two adjacent panels being filled in so as at least to ensure continuity of the secondary watertightness barrier.

In a preferred embodiment, each panel has the overall shape of a right-angled parallelepiped, the first rigid plate and the first layer of thermal insulant having, in plan view, the shape of a first rectangle, the second layer of thermal insulant and the second rigid plate having, in plan view, the shape of a second rectangle, the two rectangles having their sides substantially parallel, the length and width of the second rectangle being less respectively than the length and width of the first rectangle, a peripheral border thus being formed on each panel around the primary insulating barrier element of the said panel it is understood that the above-mentioned rectangular shape for the first and second rigid plates and the layers of thermal insulant, which correspond to them, includes the square shape; it is possible to make provision for the two rectangles defining, in plan view, the primary and secondary insulating barrier elements of one and the same panel to have substantially the same centre, the peripheral border of the said panel having a substantial constant width.

It is preferable for a prefabricated panel to be fixed to the bearing structure by virtue of fixing means distributed uniformly in line with the peripheral border of the panel; it is possible to make provision for the means for fixing a panel to the bearing structure to be studs fixed substantially perpendicularly to the said bearing structure, the said studs each having their free end threaded, the relative layout of the panels and of the studs being achieved so that the studs are in line with the peripheral border of a panel, a pit being formed in the said peripheral border in line with each stud through the flexible sheet of the panel and through the first layer of thermal insulant, the bottom of the pit consisting of the first rigid plate of the panel and including an orifice which allows a stud to pass through, a washer fitted over the stud bearing against the bottom of the pit and being held on by a nut screwed onto the stud in order to form a means for fixing the panel to the bearing structure.

It is obvious that, at each pit and each joint between panels, when the panels are assembled to the bearing structure, there is no longer any continuity of the secondary barriers formed by the panels; according to the invention, the zones at the junction between two adjacent panels are filled in so as to ensure continuity of the three barriers constituted by the panels; thus, to ensure continuity of the secondary insulating barrier, provision is made for each pit to be filled in, after a panel has been fixed to the bearing structure, by means of a plug of thermally insulating material, the joints which there are between the secondary insulating barrier elements of two adjacent panels also being filled in using a thermal insulating material. Furthermore, to ensure continuity of the watertightness of the secondary watertightness barrier, provision is made that, in line with the pits and with the joints between panels, the adjacent peripheral borders of two adjacent panels are covered with a strip of flexible sheet including at least one continuous fine metal foil, the said strip being bonded to the two adjacent peripheral borders and, by means of its metal foil, ensuring continuity of watertightness. To ensure continuity of the primary insulating barrier, provision is advantageously made for the peripheral zone which there is between the primary insulating barrier elements of two adjacent panels to be filled in with insulating tiles, each of which consists of a layer of thermal insulant covered by a rigid plate, each tile having the thickness of the primary insulating barrier, so that after assembly the plates of the insulating tiles and the second rigid plates of the panels constitute a substantially continuous wall capable of supporting the primary watertightness barrier.

In a known way, the weld support associated with the metal strakes of the primary watertightness barrier is advantageously a section having an angle bracket-shaped cross-section, one of the flanges of the angle bracket being welded to the turned-up edges of two adjacent metal strakes of the primary watertightness barrier, while the other flange is fitted into a groove made in the thickness of the second rigid plate of a panel; according to an advantageous arrangement, each second rigid plate of a panel has two parallel grooves, each one accommodating a weld support, the central zones of the second rigid plates of two adjacent panels each being covered by a strake of the primary watertightness barrier, while another strake of the same width makes the join between the two aforementioned strakes.

According to a preferred embodiment, the flexible sheet which provides the secondary watertightness barrier function in each panel consists of three layers, the two outer layers being fibreglass fabrics, while the intermediate layer is a metal foil; of course, the same material is preferably used to form the strips of flexible sheet fitted in line with the peripheral borders of the panels; the metal foil may, advantageously, be an aluminium foil having a thickness of approximately 0.1 mm.

The layers of thermal insulant of the panels advantageously consist of a cellular plastic, such as a polyurethane foam especially reinforced with fibreglass using mats, fabrics, wovens, filaments or the like; these panels may include, parallel to their long faces, a plurality of fibreglass fabrics forming substantially parallel lamellae; in these layers, the lamellae may be equidistant but it is also possible to make provision for the lamellae to be arranged with a separation which shortens with the decrease in service temperature in the zone in question of the layer, to give optimum reinforcement in the zone where the mechanical stresses due to the cooling of the tank are at a maximum. It is possible, in a known way, to make provision for each panel to bear against the bearing structure via elements made of polymerizable resin making it possible to compensate for the imperfections in the walls of the bearing structure so that, regardless of the local deformations of the said bearing structure, it is possible, by virtue of the second plates of the panels and of the plates of the insulating tiles fitted in line with the peripheral borders of the panels, to obtain a uniform continuous surface constituting a satisfactory support for the metal strakes of the primary watertightness barrier.

In a known way, the corner connection between the primary and secondary barriers in the zones where the walls of the bearing structure meet at an angle, is achieved in the form of a connecting ring, the structure of which remains substantially constant along the solid angle of intersection of the walls of the bearing structure. According to the invention, the connecting ring has a substantially square cross-section, its faces being in the extension of each of the watertightness barriers arriving at the corner of the tank, the said ring including, at each of its ridges, two flanges in the extension of its faces except for the ridge closest to the solid angle of intersection of the walls forming the corner of the bearing structure, the two flanges pointing towards the bearing structure being welded onto flats perpendicular to the said walls and borne by them, the other flanges each being secured to an element forming part of one of the primary or secondary insulating barriers; it is preferable for the zones delimited between the connecting ring and the corner walls of the bearing structure as well as the internal space delimited by the ring of square cross-section to be filled with a thermal insulating material.

BRIEF DESCRIPTION OF THE DRAWINGS

In order to make the subject matter of the invention easier to understand, one embodiment thereof represented in the appended drawing will now be described merely by way of non-limiting illustration. In this drawing:

FIG. 2 represents, in perspective, a panel of the tank according to the invention, associated with a strip of flexible sheet and with insulating tiles represented in the assembled position before being attached;

FIG. 2A represents in detail the zone marked 2A in FIG. 2;

FIG. 4 represents a detailed view of the connecting ring of FIG. 3, before the fitting of the primary and secondary insulating barrier elements which are associated with it and which allow connection to a main-run panel of the tank;

FIG. 4A represents in detail the part 4A of FIG. 4;

FIG. 5 represents diagrammatically, in section, a first embodiment of the layers of thermal insulant forming the panels of the tank;

FIG. 6 represents an alternative embodiment of the panel of FIG. 5.

DETAILED DESCRIPTION OF THE INVENTION

Figure 1:
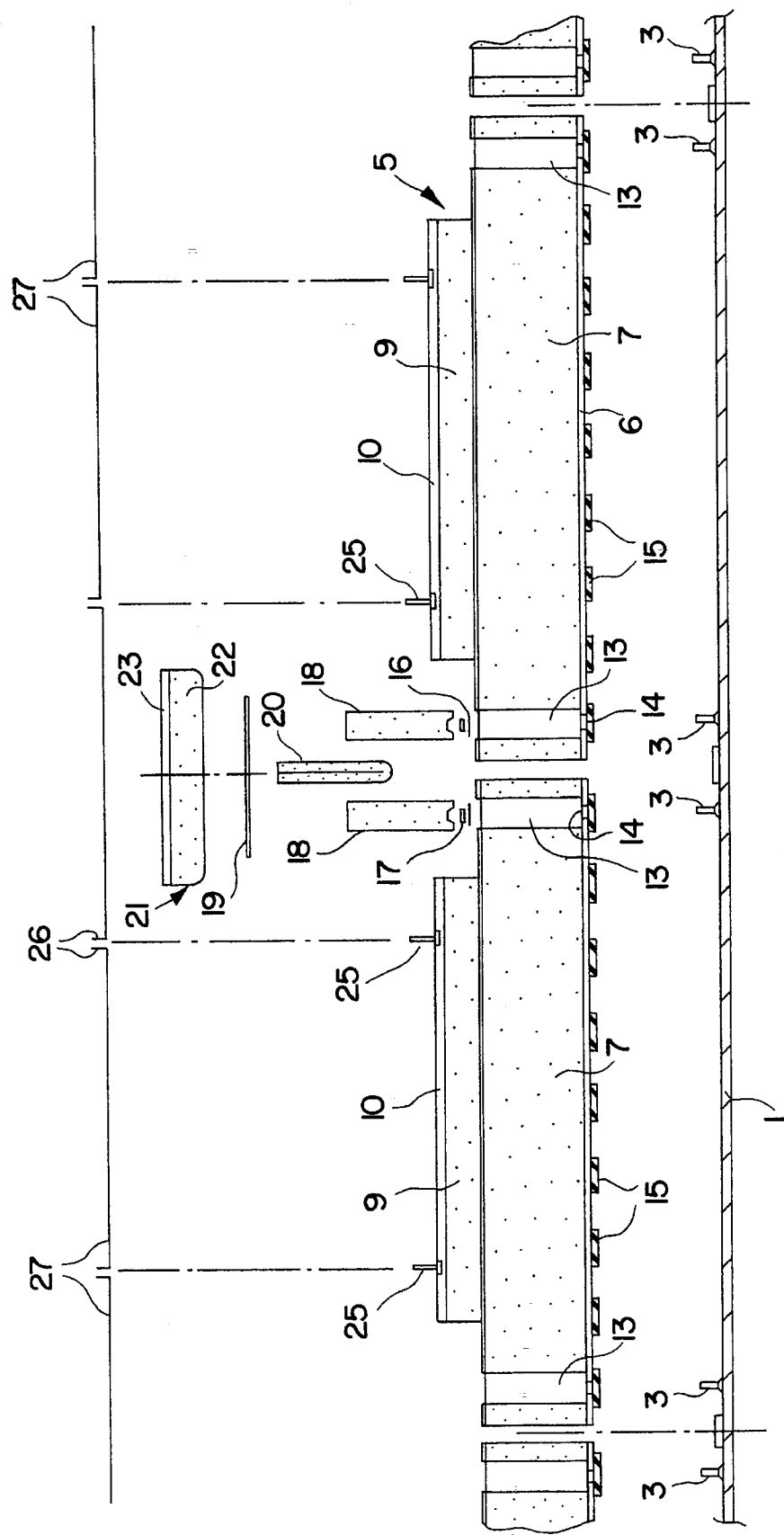
FIG. 1 represents, in section, perpendicular to the wall of a bearing structure consisting of the double hull or double transverse wall of a ship, and in an exploded position diagrammatically featuring the assembly, the various elements of a tank according to the invention in a zone of the tank not close to a corner of the tank.

Referring to the drawing, and more particularly to FIG. 1, it can be seen that i has been used to denote the wall of the double hull of the ship, where the tank according to the invention which is going to be described is installed. It is known that the hull of a ship also includes transverse bulkheads which divide the hull into compartments, these bulkheads also being double; in FIGS. 3 and 4 the wall of a double transverse bulkhead which delimits such a tank has been denoted by 2. The walls 1 and 2 constitute the bearing structure of the tank described. They each bear studs 3 which are welded to them perpendicularly and the free end of which is threaded. The studs 3 are arranged in lines parallel to the ridge 4 consisting of the intersection of the wall 1 and bulkhead 2.

The two secondary barriers and the primary insulating barrier are produced using panels denoted by 5 overall. A panel 5 has substantially the shape of a right-angled parallelepiped; it consists of a first plate 6 of ply surmounted by a first layer of thermal insulant 7, itself surmounted by a flexible sheet 8; located on the sheet 8 is a second layer of thermal insulant 9 which itself bears a second plate of ply 10. The subassembly 9, 10 constitutes a primary insulating barrier element and, in plan view, has a rectangular shape, the sides of which are parallel to those of the subassembly 6, 7, 8; the two subassemblies, in plan view, have the shape of two rectangles having the same centre, a peripheral border 11 of constant length existing right around the subassembly 9, 10 and consisting of the border region of the subassembly 7, 8, 9. The subassembly 6, 7 constitutes a secondary insulating barrier element. The sheet 8 which covers this subassembly 6, 7 constitutes a secondary watertightness barrier element.

The panel 5 which has just been described may be prefabricated in order to form an assembly, the various constituent parts of which are bonded together in the arrangement indicated hereinabove; this assembly thus forms the secondary barriers and the primary insulating barrier. The layers of thermal insulant 7 and 9 may consist of a cellular plastic such as a polyurethane foam which has been given good mechanical properties by inserting fibreglass fabrics therein. It is preferable, for producing these layers of thermal insulant, to arrange the fibreglass fabrics in the thickness of the layer so that they constitute lamellae 12a, 12b parallel to the long faces of the layers 7 and 9, that is to say the long faces of the panel 5. In FIG. 5, an arrangement has been represented in which the lamellae 12a have a separation which shortens towards the inside of the tank where a temperature of approximately −160° C. prevails. As an alternative, FIG. 6 represents an embodiment of the thermal insulating layer in which the lamellae 12b have a constant separation throughout the thickness of the layer. It is of course possible to adopt one technique for the first layer of a panel and the other technique for the second layer.

The flexible sheet 8 which is sandwiched between the primary and secondary insulating barrier elements, consists of a composite material including three layers: the two outer layers are fibreglass fabrics and the intermediate layer is a thin metal foil, for example an aluminium foil with a thickness of approximately 0.1 mm. This metal foil constitutes the secondary watertightness barrier and is bonded onto the layer of thermal insulant 7; its flexibility, resulting from its small thickness, allows it to follow the deformations of the panel 5 which are due to the deformation of the hull in heavy seas or to the tank being subjected to cold. To fix the panels 5 to the bearing structure there are provided, evenly distributed around the entire perimeter of the panel, pits 13 which are cylindrical recesses made in the peripheral border 11 through the flexible sheet 8 and the layer of insulant 7 as far as the plate of ply 6; the bottom of a pit 13 thus consists of the first rigid plate 6 of the panel 5; the bottom of the pit 13 is perforated in order to form an orifice 14, the diameter of which is sufficient to allow a stud 3 to pass through; the studs 3 and the orifices 14 are arranged such that if a panel 5 is offered up facing the wall 1 or 2 of the bearing structure, the said panel can be positioned with respect to the wall so that a stud 3 faces each orifice 14.

It is known that the walls 1 or 2 of a ship exhibit discrepancies with respect to the theoretical surface envisaged for the bearing structure, simply as a result of manufacturing inaccuracies. In the known way, these discrepancies are compensated for by bringing the panels 5 to bear against the bearing structure via wads of polymerizable resin 15 which make it possible, starting from an imperfect bearing structure surface, to obtain cladding consisting of adjacent panels 5 exhibiting second plates 10 which, overall, define a surface which has practically no discrepancy with respect to the desired theoretical surface.

When the panels 5 are thus offered up against the bearing structure with the interposition of wads of resin 15, the studs 3 penetrate the orifices 14 and a bearing washer 16 and a clamping nut 17 are fitted over the threaded end of the studs 3. The washer 16 is pressed by the nut 17 against the first rigid plate 6 of the panel 5 at the bottom of the pit 13. A fixing of each panel 5 against the bearing surface is thereby obtained using a plurality of points distributed across the entire periphery of the panel, which is favourable from the mechanical point of view.

When such fastening has been achieved, the pits 13 are plugged by inserting plugs 18 of thermal insulating material therein, these plugs coming flush with the first layer of thermal insulant 7 of the panel. Furthermore, a thermal insulating material is fitted into the joint zones which separate the subassemblies (6, 7, 8) of two adjacent panels 5, this thermal insulating material consisting, for example, of a sheet of plastic foam 20 folded back on itself into the shape of a U and forcibly inserted into the zone of the joint. However, although the continuity of the secondary insulating barrier has thus been restored, the same is not true for the continuity of the secondary watertightness barrier formed by the flexible sheet 8, since the latter has been perforated at each pit 13. In order to restore the continuity of the secondary watertightness barrier, a strip 19 formed of a flexible sheet identical to the flexible sheet 8 is placed on the peripheral border 11 which there is between two subassemblies 9, 10 of two adjacent panels 5 and the strip 19 is bonded onto the peripheral borders 11 so as to close off the perforations at each pit 13 and the joints between panels, this restoring the continuity of the secondary watertightness barrier.

Between the subassemblies (9, 10) of two adjacent panels 5 there therefore remains a set-back zone situated in line with the peripheral borders 11, this setback being substantially as deep as the thickness of the primary insulating barrier (9, 10). These set-back zones are filled in by fitting insulating tiles 21 each consisting of a layer of thermal insulant 22 and of a rigid plate of ply 23. The insulating tiles 21 have a size such that they completely fill the zone situated above the peripheral borders of two adjacent panels 5, these insulating tiles being bonded onto the strips 19 on the same side as their layer 22 so that after they have been fitted their plate 23 provides continuity between the plates 10 of two adjacent panels 5. These insulating tiles 21, the width of which is governed by the distance between two subassemblies 9, 10 of two adjacent panels may have any length but it is preferable for their length to be short so that, if need be, they can be fitted easily even assuming a slight misalignment between two adjacent panels 5.

Thus, by fitting the panels 5 against the bearing structure, the secondary insulating barrier, the secondary watertightness barrier and the primary insulating barrier have been formed in one self swoop. It is clear that the amount of labour required is consequently considerably reduced for fitting these three barriers by comparison with the embodiments of the state of the art.

Of course, the panels 5 may be prefabricated in mass at the factory, which further improves the economic nature of this embodiment.

A substantially continuous face consisting of the rigid plates 10 and 23 of the panels 5 and of the insulating tiles 21 has thus been produced. All that remains is to fit the primary watertightness barrier which will be supported by these rigid plates. To do this, provision has been made, at the time of manufacture of the panels 5, to form in the plates 10 grooves 24 having a T-shaped cross-section, the web of the T being perpendicular to the face of the plate 10, which faces the inside of the tank, and the two wings of the T being parallel to the said face. A weld support consisting of a section 25 having an angle bracket-shaped cross-section is fitted into these grooves 24, one of the flanges 25a of the angle bracket being welded to the turned-up edges 26 of two adjacent metal strakes 27 of the primary watertightness barrier, while the other flange 25b is engaged in that part of the groove 24 which is parallel to the mid-plane of the plate 10. In a known way, the strakes 27 consist of metal sheets of invar 0.7 mm thick. The weld support 25 can slide inside the groove 24 so that an expansion joint has thus been produced, this allowing relative movement of the strakes 27 of the primary watertightness barrier with respect to the rigid plates 10 and 23 which support it. Each plate 10 of a panel 5 includes two parallel grooves 24 spaced apart by the width of a strake and arranged symmetrically with respect to the longitudinal axis of the panel 5. The panels 5 are dimensioned so that the distance between two adjacent weld flanges 25 fitted into two adjacent panels 5 is equal to the width of a strake 27; thus a strake 27 can be fitted in line with the central zone of each plate 10 and a strake 27 can be fitted between the two strakes 27 which cover the central zones of two adjacent panels 5.

It is appropriate to note that, according to the invention, the primary watertightness barrier is supported by a rigid plate, this giving good resistance to impacts caused by the movements of the liquid in the tank.

To connect the primary and secondary barriers in the corners of the tank close to a solid angle of intersection 4, use is made of a connecting ring represented in detail in FIG. 4. The structure of this connecting ring is substantially constant right along the solid angle of intersection 4 of the walls 1 and 2 of the bearing structure.

The connecting ring consists of a welded assembly of several metal sheets. A first metal sheet 30 in cross-section has the shape of a double angle bracket; it is assembled by welding to a flat metal sheet 31 which has a right-angled return 31a and to a flat metal sheet 32 which is welded to a flange of one of the right-angled bends of the metal sheet 30 and to the right-angled return 31a of the metal sheet 31. Connection (30–32) is such that the metal sheet 32 lies between the metal sheet 30 and a right-angled return 33a provided on the border region of a metal sheet 33; in the same way, the connection (30–31) is such that the metal sheet 31 lies between the metal sheet 30 and the right-angled return 34a of a metal sheet 34. The metal sheet 30 and the metal sheets 31 and 32 define an internal volume between them, the cross-section of which is square, the length of the side of this square corresponding to the thickness of the primary insulating barrier of the panels 5. To weld together such a connecting ring by continuous resistance welding between two welding wheels, the connection (30–32–33a) is first of all welded, then the connection (31a–32–35a) is welded and finally the connection (30–31–34a) is welded: in that way, there is no production difficulty even if the thickness of the primary insulating barrier is small.

By way of numerical example, let us take panels 5 with a length of 3.30 metres and a width of 990 mm, the thickness of the secondary insulating barrier being 180 mm and that of the primary insulating barrier being 70 mm. The width of the strakes 27 between two turned-up edges is 500 mm. The square of the cross-section of the connecting ring therefore has a side of length 70 mm approximately, the metal sheets forming this ring being invar sheets which are 1.5 mm thick.

The connecting ring thus formed is secured to the bearing structure by welding onto flats 36 which are perpendicular to the walls 1 and 2. The metal sheet 32 is welded onto one of the flats 36 while the metal sheet 31 is welded onto the other flat 36; this connecting ring is thus fastened to the bearing structure at the primary watertightness barrier since the metal sheet 35 is in the extension of the metal sheet 31.

Blocks of insulating material 37, 38 are then inserted into the gaps between the connecting ring and the solid angle of intersection 4; likewise blocks of insulating material 39 are inserted into the square cross-section part of the connecting ring. The spaces remaining between the blocks 37 and 38 and the metal sheets 32 and 31 respectively are bunged using glass wool 40.

Figure 3:
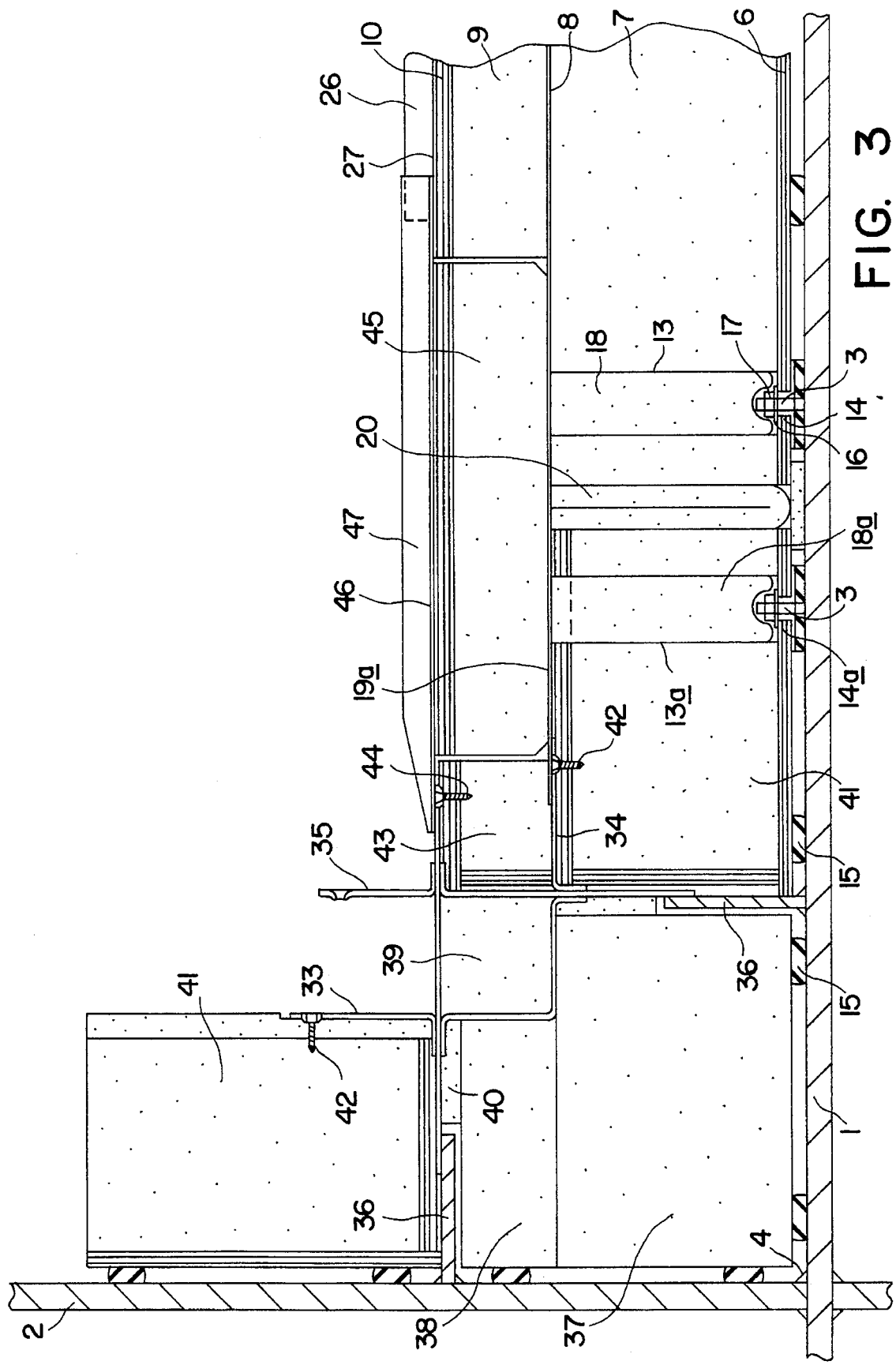
FIG. 3 represents, in section perpendicular to the solid angle of intersection of a corner of the bearing structure, the various elements forming the tank according to the invention and especially the connecting ring and the special elements of secondary and primary barriers which are associated with it.

Represented in FIG. 3 is the connection between such a connecting ring and the lining formed on the walls 1 and 2 by the adjacent panels 5. A panel 5 is represented in the right-hand part of FIG. 3. Before it is fitted, a panel 41 is fitted which is inserted, with interposition of wads 15, between the wall 1 and the metal sheet 34 (or respectively 33), the said panel 41 being covered with ply on all of its faces except for the one which faces the adjacent panel 5. This panel 41 comes into abutment against the metal sheet 31 (or respectively 32); it is fixed against the wall 1 by forming pits 13a similar to the pits 13, the bottom of which has an orifice 14a through which a stud 3 can penetrate; the panel 41 is fixed to the hull by nuts associated with the studs 3 located at the bottom of the pits 13a, the pits 13a then being filled in with plugs 18a. After the panel 41 has been fitted, countersunk screws 42 are used to secure this panel 41 to the metal sheet 34 (or respectively 33). The adjacent panel 5 is then positioned, an insulating foil 20 is inserted into the joint space and the metal sheet 34 (or respectively 33), the block 41 and the peripheral border of the adjacent panel 5 are covered using a strip 19a of flexible sheet identical to the strip 19. The strip 19a produces continuity of watertightness on the secondary watertightness barrier.

An insulating panel 43 which consists of a polarurethane foam and which is bordered on two of its faces by plates of ply is then fitted between the metal sheets 32 and 34 (or respectively 35 and 33), one of the plates of ply coming to bear against the metal sheet 31 (or respectively 32) and the other coming in line with the metal sheet 32 (or respectively 35) which is fixed to this panel 43 by means of countersunk screws 44. This panel 43 extends slightly beyond the metal sheet 32 (or respectively 35) and the space remaining between the panel 43 and the subassembly (9, 10) of the adjacent panel is filled with an insulating tile 45, of which that face which faces the inside of the tank consists of a plate of ply. Thus the presence of a continuous rigid plate between the plate 10 of the adjacent panel 5 and the free border region of the metal sheet 32 (or respectively 35) is ensured. The panels 5 as a whole are covered by the strakes 27 and the end of the strakes 27 and the metal sheet 32 (or respectively 35) are joined together using connecting strakes 46, the two ends of which are welded respectively to the strakes 27 and the metal sheet 32 (or respectively 35) and the turned-up edges 47 of which are welded to the end of the turned-up edges 26, these special strakes 46 also being butt-welded together. Thus the continuity of the primary watertightness barrier is ensured at the corners of the tank.

It may be observed that the embodiment which has just been described makes it possible to obtain insulating characteristics which are as good as in the embodiments of the prior art with a cost price reduced by approximately 25% owing to the use of prefabricated elements, the mechanical stresses on which are exerted essentially on the primary watertightness barrier and are taken up by the bearing structure via the connecting ring and the flats 36.

We claim:

1. A watertight and thermally insulating tank built into a bearing structure, comprising:

a primary watertight barrier in contact with a material contained within said tank and comprising metal strakes including edges turned upwardly towards an interior of said tank, said strakes being made of thin sheet metal with a low coefficient of expansion;

a secondary watertight barrier positioned between said primary watertight barrier and the bearing structure;

a primary thermal insulating barrier;

a secondary thermal insulating barrier, said primary thermal insulating barrier and said secondary thermal insulating barrier being alternately arranged with said primary watertight barrier and said secondary watertight barrier; and a weld support mechanically held on said primary thermal insulating barrier and constituting an expansion joint, said strakes being butt-welded via said turned-up edges to two faces of said weld support;

said secondary watertight barrier, said secondary thermal insulating barrier and said primary thermal insulating barrier each comprising a set of prefabricated panels fixed to the bearing structure, wherein a zone at a junction between two adjacent panels is filled in so as at least to ensure continuity of said secondary watertight barrier, each prefabricated panel being formed of:

a first rigid plate including a layer of thermal insulant, said panels and said layer of thermal insulant together forming said secondary thermal insulating barrier;

a flexible sheet bonded substantially to the entire surface of said layer of thermal insulant, said flexible sheet including at least one continuous fine metal foil forming said secondary watertight barrier;

a second layer of thermal insulant that at least partially covers said flexible sheet and that is bonded thereto; and a second rigid plate covering said second layer of thermal insulant, said second rigid plate and said second layer of thermal insulant forming said primary thermal insulation barrier.

2. Tank according to claim 1, characterized in that each panel has the overall shape of a right-angled parallelepiped, the first rigid plate (6) and the first layer (7) of thermal insulant having, in plan view, the shape of a first rectangle, the second layer (9) of thermal insulant and the second rigid plate (10) having, in plan view, the shape of a second rectangle, the two rectangles having their sides substantially parallel, the length and width of the second rectangle being less respectively than the length and width of the first rectangle, a peripheral border (11) thus being formed on each panel (5) around the primary insulating barrier element of the said panel.

3. Tank according to claim 2, characterized in that the two rectangles defining, in plan view, the primary and secondary insulating barrier elements of one and the same panel have substantially the same centre, the peripheral border (11) of the said panel having a substantially constant width.

4. Tank according to claim 3, characterized in that the prefabricated panel (5) is fixed to the bearing structure (1, 2) by virtue of fixing means distributed uniformly in line with the peripheral border (11) of the panel (5).

5. Tank according to claim 2, characterized in that a prefabricated panel (5) is fixed to the bearing structure (1, 2) by virtue of fixing means distributed uniformly in line with the peripheral border (11) of the panel (5).

6. Tank according to claim 5, characterized in that the means for fixing a panel (5) to the said bearing structure (1, 2) are studs (3) fixed substantially perpendicularly to the bearing structure (1, 2), the said studs (3) each having their free end threaded, the relative layout of the panels (5) and of the studs (3) being achieved so that the studs (3) are in line with the peripheral border (11) of a panel, a pit (13) being formed in the said peripheral border (11) in line with each stud (3) through the flexible sheet (8) of the panel (5) and through the first layer (7) of thermal insulant, the bottom of the pit (13) consisting of the first rigid plate (6) of the panel (5) and including an orifice (14) which allows a stud (3) to pass through, a washer (16) fitted over the stud (3) bearing against the bottom of the pit (13) and being held on by a nut (17) screwed onto the stud (3) in order to form a means for fixing the panel (5) to the bearing structure (1, 2).

7. Tank according to claim 6, characterized in that each pit (13) is filled in, after a panel (5) has been fixed to the bearing structure (1, 2), by means of a plug (18) of thermally insulating material, a joint between the secondary insulating barrier elements of two adjacent panels (5) also being filled in using a thermal insulating material (20).

8. Tank according to claim 6, characterized in that, in line with the pits (13) and with the joints between panels, the adjacent peripheral borders (11) of two adjacent panels (5) are covered with a strip (19) of flexible sheet including at least one continuous fine metal-foil, the said strip (19) being bonded to the two adjacent peripheral borders (11) and, by means of its metal foil, ensuring continuity of watertight of the secondary watertight barrier.

9. Tank according to claim 8, characterized in that a peripheral zone which there is between the primary insulating barrier elements of two adjacent panels is filled in with insulating tiles (21), each of which consists of a layer (22) of thermal insulant covered by a rigid plate (23), each tile (21) having the thickness of the primary insulating barrier, so that after assembly the plates (23) of the insulating tiles (21) and the second rigid plates (10) of the panels (5) constitute a substantially continuous wall capable of supporting the primary watertightness barrier.

10. Tank according to claim 1, characterized in that the zones at the junction between two adjacent panels are filled in so as to ensure continuity of said watertight and thermal insulating barriers constituted by the panels.

11. Tank according to claim 1, characterized in that the weld support associated with the metal strakes of the primary watertight barrier is a section having an angle bracket-shaped cross-section including a flange being welded to turned-up edges of two adjacent metal strakes of the primary watertight barrier, another flange of the section having an angle bracket-shaped cross-section is fitted into a groove made in the thickness of the second rigid plate of a panel.

12. Tank according to claim 11, characterized in that each second rigid plate of a panel has two parallel grooves, each one accommodating a weld support, the central zones of the rigid plates of two adjacent panels each being covered by a first strake of the primary watertight barrier, while a second strake of the same width makes a joint between the first and second strakes.

13. Tank according to claim 1, characterized in that the flexible sheet of a panel consists of three layers, two outer layers being fiberglass fabrics, and an intermediate layer of a metal foil.

14. Tank according to claim 13, characterized in that the metal foil is an aluminium foil having a thickness of approximately 0.1 mm.

15. Tank according to one of claim 1, characterized in that the layers (7, 9) of thermal insulant of the panels (5) consist of a cellular plastic and include, parallel to long faces of the panels, a plurality of fibreglass fabrics forming substantially parallel lamellae.

16. Tank according to claim 15, characterized in that the lamellae are arranged with a separation which shortens with the decrease in service temperature in the zone in question of the layer.

17. Tank according to claim 15, characterized in that the lamellae are equidistant.

18. Tank according to claim 1, characterized in that the bearing structure includes walls and each panel bears against the bearing structure via elements made of polymerizable resin, thus making it possible to compensate for imperfections in said walls of the bearing structure.

19. Tank according to claim 1, characterized in that the bearing structure includes walls, a corner connection between said primary and secondary barriers in a zone where said walls of the bearing structure intersect substantially at right angles, is achieved in the form of a connecting ring, the structure of which remains substantially constant along the intersection of the walls of the bearing structure.

20. Tank according to claim 19, characterized in that the connecting ring has a substantially square cross-section, its faces being in the extension of each of the watertight barriers arriving at the corner connections of the tank, said ring including a plurality of ridges and, at each of said ridges, two flanges in the extension of its faces except for a ridge closest to the intersection of the walls of the bearing structure, said ring also including two flanges pointing towards the bearing structure and being welded onto flats perpendicular to the side walls and borne by them, said ring further including other flanges each being secured to an element forming part of one of the primary or secondary thermal insulating barriers.

21. Tank according to claim 20, characterized in that a zone delimited by the connecting ring and the walls of the bearing structure and an internal space delimited by the connecting ring are filled with a thermal insulating material.

22. A tank according to claim 1, wherein said bearing structure is a ship.

* * * * *